(12) United States Patent
Rich

(10) Patent No.: US 8,136,854 B2
(45) Date of Patent: Mar. 20, 2012

(54) CONCEALABLE LICENSE PLATE MOUNTING SYSTEM

(75) Inventor: Stewart Bradford Rich, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 12/837,576

(22) Filed: Jul. 16, 2010

(65) Prior Publication Data

US 2012/0013136 A1    Jan. 19, 2012

(51) Int. Cl.
*G09F 7/00* (2006.01)
(52) U.S. Cl. .............. 293/117; 293/1; 296/37.1; 40/209
(58) Field of Classification Search ............... 293/117, 293/1; 296/37.1; 40/200–211
See application file for complete search history.

(56) References Cited

U.S. PATENT DOCUMENTS

| | | | |
|---|---|---|---|
| 4,657,296 A | 4/1987 | Nishii et al. | |
| 4,917,426 A | 4/1990 | Copp | |
| 5,518,350 A | 5/1996 | Kyprios | |
| 5,813,640 A | 9/1998 | Koch et al. | |
| 6,729,053 B2 | 5/2004 | Castro | |
| 6,757,998 B1 | 7/2004 | Lucatorto | |
| 7,111,420 B2 | 9/2006 | Glickman | |
| 7,401,427 B2 | 7/2008 | Zander | |
| 7,818,905 B1 * | 10/2010 | Stahel et al. | 40/492 |
| 2007/0028490 A1 | 2/2007 | Beer et al. | |

* cited by examiner

*Primary Examiner* — Glenn Dayoan
*Assistant Examiner* — Melissa A Black
(74) *Attorney, Agent, or Firm* — Clifford B. Vaterlaus, Esq; Emerson Thomson Bennett

(57) ABSTRACT

This disclosure relates to apparatuses and methods for providing and using concealable license plate mounting systems. Specifically, the present invention is a license plate mounting system that provides an aesthetically pleasing and aerodynamically efficient bumper surface in states not requiring front license plates, while simultaneously allowing the simple and secure affixing of a license plate in states requiring the display of a front license plate.

20 Claims, 8 Drawing Sheets

CONCEALABLE LICENSE PLATE MOUNTING SYSTEM

BACKGROUND

A. Field of Invention

This invention pertains to the art of methods and apparatuses for mounting vehicle license plates.

B. Description of the Related Art

The United States, and many other countries around the world, do not currently have standardized rules regarding the placement of vehicle license plates on the front of automobiles; for example, only about two-thirds of the jurisdictions in the United States require motorists to display both a front and rear license plate. To produce vehicles for consumers who live in different states and countries, automakers have thus far been forced to either provide front bumpers 1 with a flat license plate attachment section ("carved-out" of an otherwise curved bumper)(See FIG. 1), or design bumpers that accommodate the attachment of a separate license plate bracket assembly.

Unfortunately, these solutions require automakers to sacrifice the aesthetic and aerodynamic properties of their front bumpers, while simultaneously increasing manufacturing and materials costs. A bumper with an empty carved out attachment section is more expensive to manufacture, aerodynamically inferior, and aesthetically displeasing when it is driven in a state where a front license plate is not required. Similarly, separate license plate bracket assemblies add unnecessary materials costs, impart unwanted aerodynamic properties, are susceptible to damage and failure due to road debris, and leave unsightly abrasion marks if the vehicle is subsequently licensed in a state that does not require front license plates.

FIGS. 1 and 2 show a prior art bumper structure. By way of non-limiting examples, the typical prior art front bumper 1 includes a mounting frame 5 that attaches the bumper 1 to the vehicle frame (not shown), and a plastic bumper cover (not shown) or bumper structure 3 that encases bumper components—such as reinforcing bars or ribs, bellows, and/or foam (shown in FIG. 2 as 7)—designed to absorb energy in the event of a collision. Prior art bumper configurations are susceptible to the problems described above.

There is a need in the art, therefore, for a license plate mounting system that is concealed—and aerodynamically unimposing—when the vehicle is used in a state not requiring front license plates, but that is easily and adaptably configured to accept front license plates in states with such requirements. Additionally, there is a need on the art for a concealable license plate mounting system that is inexpensive to manufacture while maintaining an aesthetically appealing appearance.

SUMMARY

According to one aspect of the present invention, a new and improved concealable license plate mounting system is provided for an associated vehicle bumper having an outer surface, a recess within the outer surface of the vehicle bumper, and at least two guide holes for receiving and guiding the movement of license plate connectors within the recess. The concealable license plate mounting system comprising a first license plate connector, having a proximal end and a distal end with a receiving cavity that operatively receives a first license plate fastener, wherein the first license plate connector is positioned entirely within the vehicle bumper recess in a storage position, and at least partially extended beyond the outer surface of the vehicle bumper in an engagement position; a second license plate connector, having a proximal end and a distal end with a receiving cavity that operatively receives a second license plate fastener, wherein the second license plate connector is positioned entirely within the vehicle bumper recess in a storage position, and at least partially extended beyond the outer surface of the vehicle bumper in an engagement position; and first and second fasteners, operatively mated with the receiving cavities of the first and second license plate connectors when the license plate connectors are in the engagement position.

In another embodiment of the invention, the concealable vehicle license plate mounting system comprises a vehicle having at least a frame, suspension, and vehicle body with a front bumper; the front bumper having an outer surface, at least two guide holes for receiving and guiding the movement of license plate connectors within a recess, a recess within the outer surface of the vehicle bumper, at least two cap ports, and a vertically disposed support member positioned within the vehicle bumper's recess and having at least two guide holes for receiving and guiding the movement of the license plate connectors within the recess; a first license plate connector, having a proximal end and distal end and a receiving cavity that operatively receives a first license plate fastener, wherein the first license plate connector is slidably positioned within a vehicle bumper guide hole and a support member guide hole, and wherein the first license plate connector is positioned entirely within the bumper recess in a storage position, and at least partially extended beyond the outer surface of the vehicle bumper in an engagement position; a second license plate connector, having a proximal end and distal end and a receiving cavity that operatively receives a second license plate fastener, wherein the second license plate connector is slidably positioned within a vehicle bumper guide hole and a support member guide hole, and wherein the second license plate connector is positioned entirely within the bumper recess in a storage position, and at least partially extended beyond the outer surface of the vehicle bumper in an engagement position; first and second fasteners, wherein the first and second fasteners are at least partially positioned within the receiving cavities of the first and second license plate connectors in both the storage and engagement positions; and cover caps operatively affixed within the bumper's cap ports when the first and second license plate connectors are in a storage position.

In yet another embodiment of the present invention, a method for providing a concealable vehicle license plate mounting system, comprises the steps of: A) providing a vehicle with: 1) a front bumper, the front bumper having an outer surface, at least two guide holes, a recess within the outer surface of the vehicle bumper, at least two cap ports, and a vertically disposed support member positioned within the vehicle bumper's recess and having at least two guide holes; 2) first and second license plate connectors, having proximal ends with a locking mechanism and distal ends with receiving cavities; 3) first and second fasteners; 4) cover caps; and 5) an associated license plate with at least two mounting apertures; B) assembling the concealable license plate system into a storage position, wherein no portion of the concealable license plate system extends beyond the outer surface of the vehicle bumper, by: 1) horizontally positioning the first and second connectors within the vehicle bumper's recess, vehicle bumper's guide holes, and support member's guide holes in a manner wherein the distal ends are distal to the vehicle engine; 2) operatively attaching the first and second fasteners to the first and second connectors, wherein the fasteners are at least partially positioned within the receiving cavities on the distal ends of the connectors; 3) operatively affixing the cover caps within the cap ports to conceal the fasteners and license plate connectors and create a substantially planar outer surface on the vehicle bumper; and C) activating the concealable license plate system by: 1) removing the cover caps; 2) moving the first and second connectors into an engagement position wherein they are least partially extended beyond the outer surface of the vehicle bumper; 3) triggering the lock mechanisms to secure the connectors in the engagement position; 4) removing the first and second fasteners from the connectors' receiving cavities; 5) positioning the associated license plate onto the connectors so that the mounting apertures align with the connectors' receiving cavities; and 6) inserting the fasteners through the license plate's mounting apertures and operatively securing the fasteners within the connectors' receiving cavities.

One advantage of this concealable license plate mounting system invention is that it provides an aesthetically pleasing, and reduced cost, solution to problems in the prior art. Using this invention maintains the aesthetic appearance of vehicles driven in states where front license plates are not required, while simultaneously providing the versatility needed to drive, or sell, the vehicle in a state requiring a front license plate to be displayed.

Moreover, another advantage of the invention arises because the license plate mounting system is concealed behind cover caps—that, when installed, provide a substantially uniform appearance to the bumper.

Another advantage of the invention, related to the concealment of the system within the vehicle bumper, is that the system components are safely positioned within the vehicle's bumper's recess in a manner that protects the system from road debris and the weather elements.

Yet another advantage of the invention is that, because the system does not require the addition of either aerodynamically inferior brackets or a bumper carve-out section, the front bumper structure can maintain its aerodynamic appearance.

Another advantage is that the absence of a supplemental bracket avoids the materials costs associated with providing a separate bracket structure.

Additionally, the invention is advantageous because the license plate mounting system secures the associated license plate in a position not contacting the vehicle bumper while in the engagement position, thus, the bumper is not scarred by either temporary or long-term affixing of front license plates.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
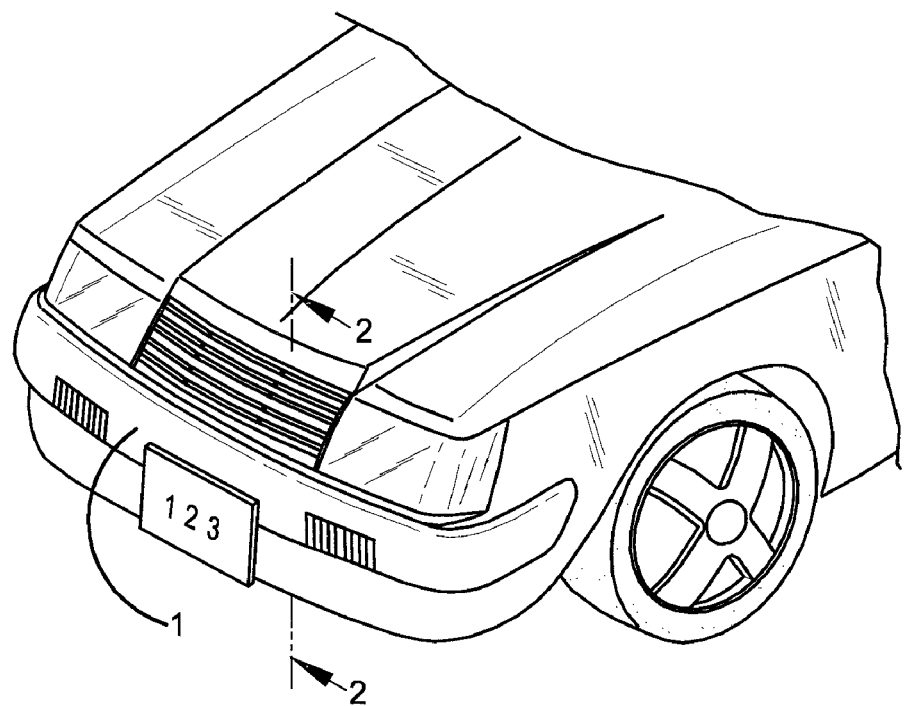
FIG. 1 illustrates a known vehicle bumper configuration; particularly, a bumper with a license plate "carve-out" mounting section.
Figure 2:
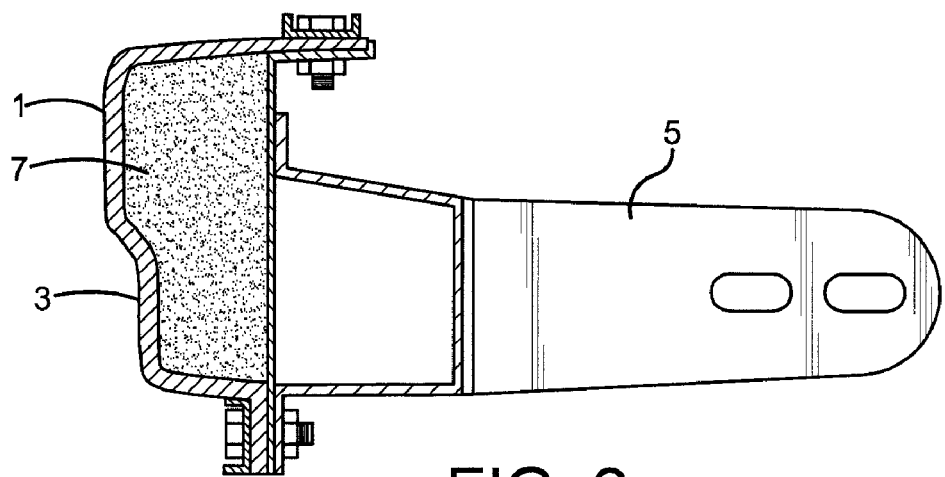
FIG. 2 is a cross-sectional view of a known vehicle bumper configuration.
Figure 4:
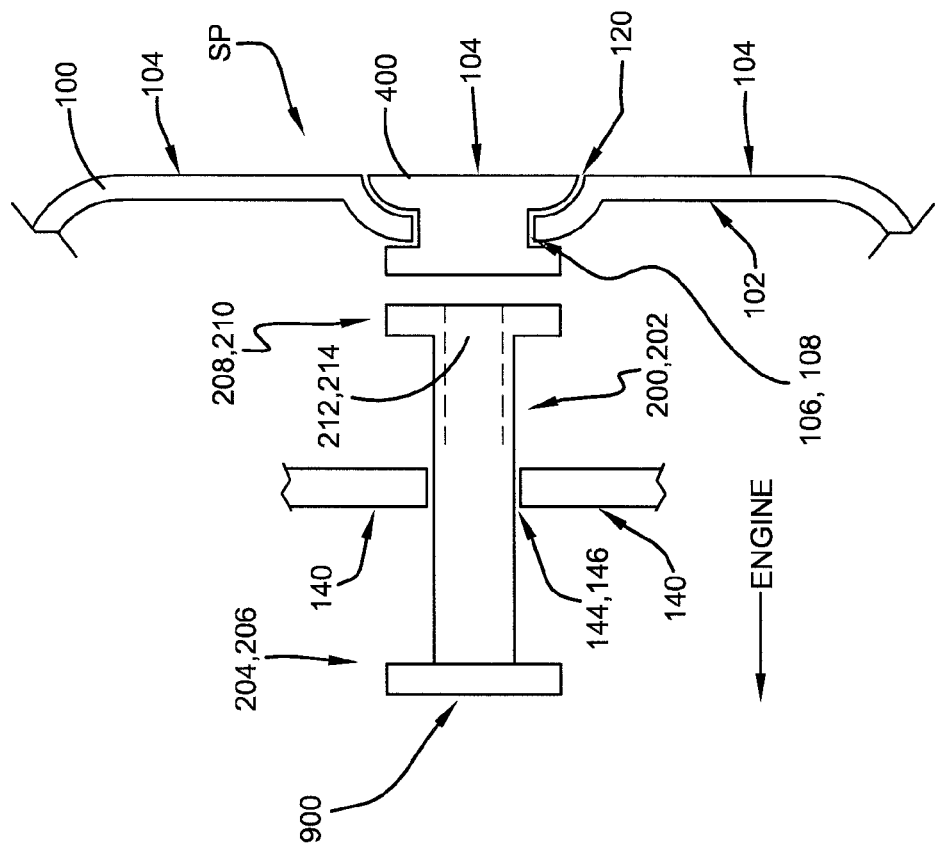
FIG. 4 is a cross-sectional plan view of a concealable license plate mounting system in a storage position.
Figure 3:
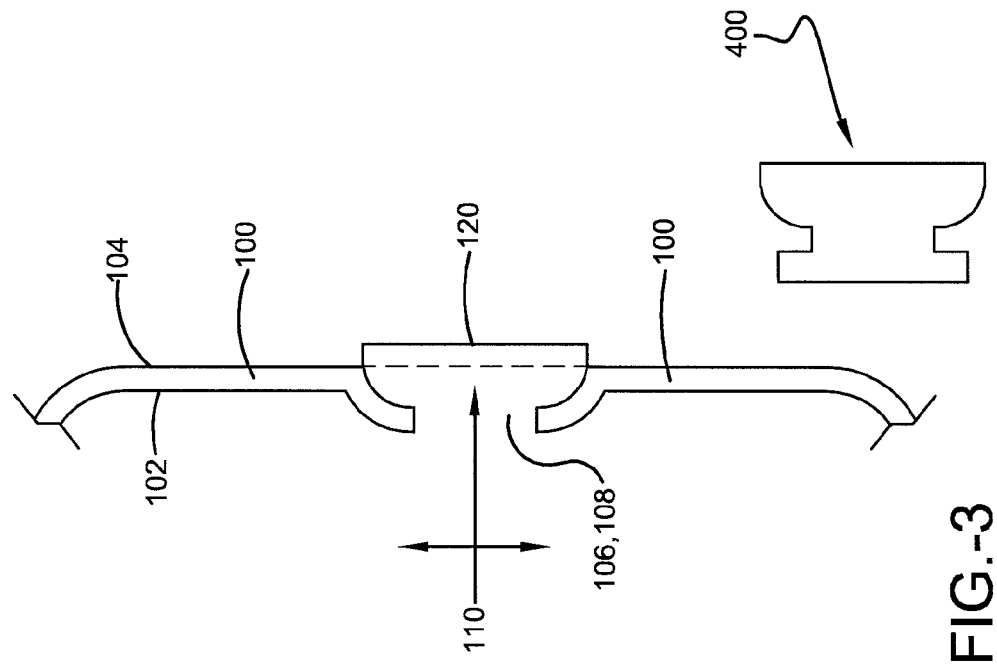
FIG. 3 is a cross-sectional plan view of a demonstrative vehicle bumper configuration according to the present invention.
Figure 5:
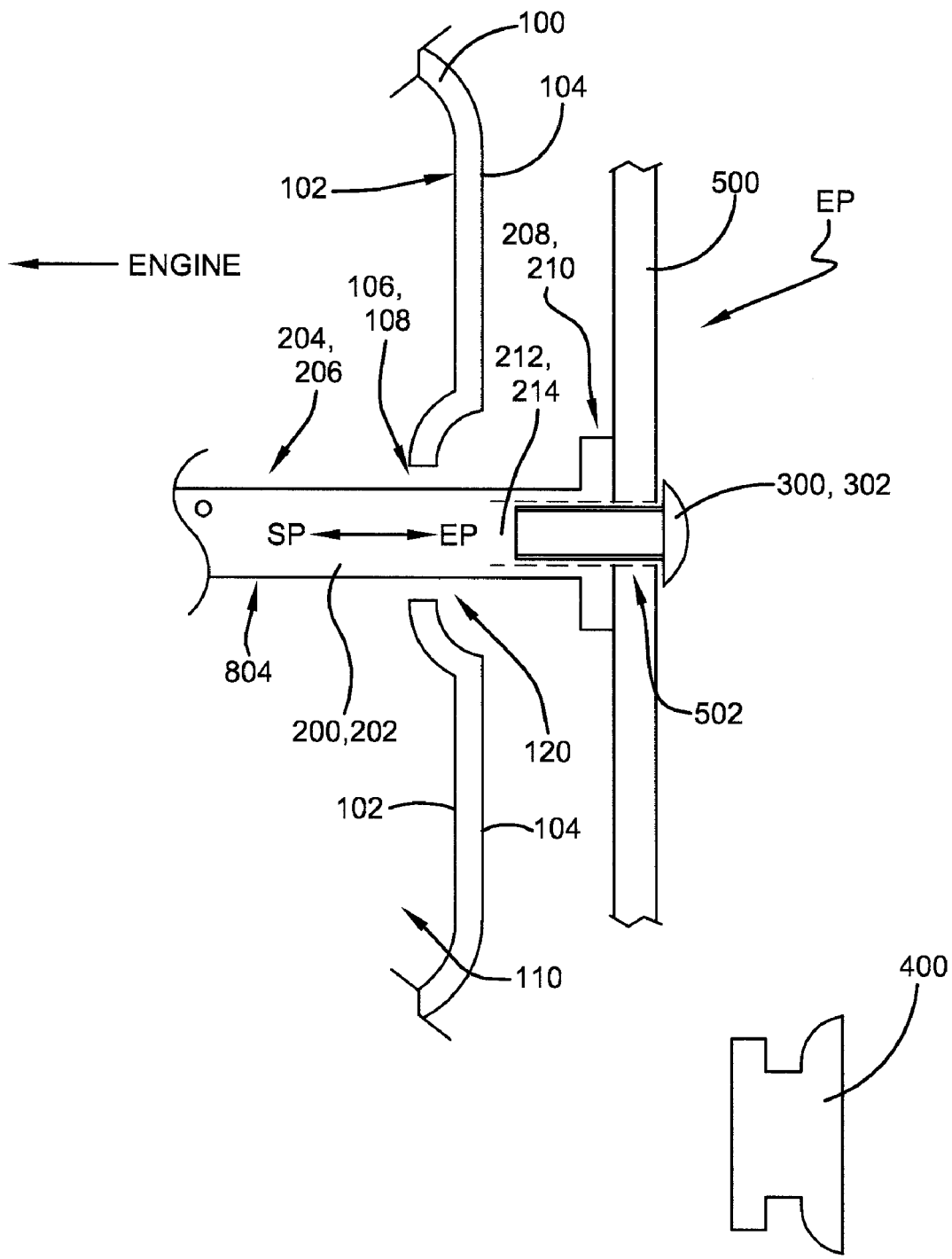
FIG. 5 is a cross-sectional plan view of a concealable license plate mounting system in an engagement position.

Referring now to the drawings wherein the showings are for purposes of illustrating embodiments of the invention only and not for purposes of limiting the same, FIGS. 3, 4, and 5 show one embodiment of the concealable license plate mounting system of the present invention. As illustrated in FIGS. 1-5, in various embodiments of the invention the concealable license plate mounting system can be used with a vehicle having a frame, suspension, and vehicle body with a vehicle bumper 1, 100; or merely with an associated bumper 100 having an inner surface 102 and an outer surface 104. It should be understood that the term vehicle is broad, and could include by way of non-limiting examples, trucks, sport-utility vehicles, and/or passenger vehicles. For the purposes of this patent application, it should also be noted that the phrase "outer surface" is of such ordinary meaning in the industry that it is meant to reference whichever bumper component—whether a cover cap, plastic bumper cover, or other bumper structure—that would be construed by a person of ordinary skill in the art as the bumper's exterior surface. Subject to certain exceptions, detailed below, the inner surface 102 of the vehicle bumper 100 defines, either in whole or in part, a recess 110 where bumper components (such as connectors 200, 202) may be located. In its broadest sense, the vehicle bumper recess 110 is merely the interior of the vehicle bumper, as defined by the substantially planar outer surface 104 of the vehicle bumper 100, or the bumper's outer surface 104 having assembled cover caps 400 (both embodiments being described in greater detail below). In some embodiments of the invention, the vehicle bumper 100 of the concealable license plate mounting system must be located on the front of the vehicle.

The vehicle bumper 100 of the present invention further includes at least two guide holes 106, 108 that receive and guide the movement of first and second license plate connectors 200, 202 within the bumper's recess 110. The license plate connectors 200, 202 are assembled into a horizontal position within the vehicle bumper's recess 110, and are selectively moveable, through the bumper's guide holes 106, 108, between a first storage position (SP) and a second engagement position (EP). In the storage position SP, the first and second license plate connectors 200, 202 are positioned entirely within the bumper's recess 110. In the engagement position EP, the first and second license plate connectors 200, 202 are moved out of the storage position SP through the bumper's guide holes 106, 108 into a position at least partially extending beyond the outer surface 104 of the vehicle bumper 100. In the engagement position EP, a license plate 500 is placed on the license plate connector's distal ends 208, 210 in a manner that aligns the license plate's mounting apertures 502 with the license plate connectors' receiving cavities 212, 214. In this configuration, the license plate fasteners 300, 302 are passed through the mounting apertures 502 and secured within the receiving cavities 212, 214 to operatively press and secure, in a manner well known in the art, the license plate 500 between the license plate connectors 200, 202 and fasteners 300, 302.

Figure 6:
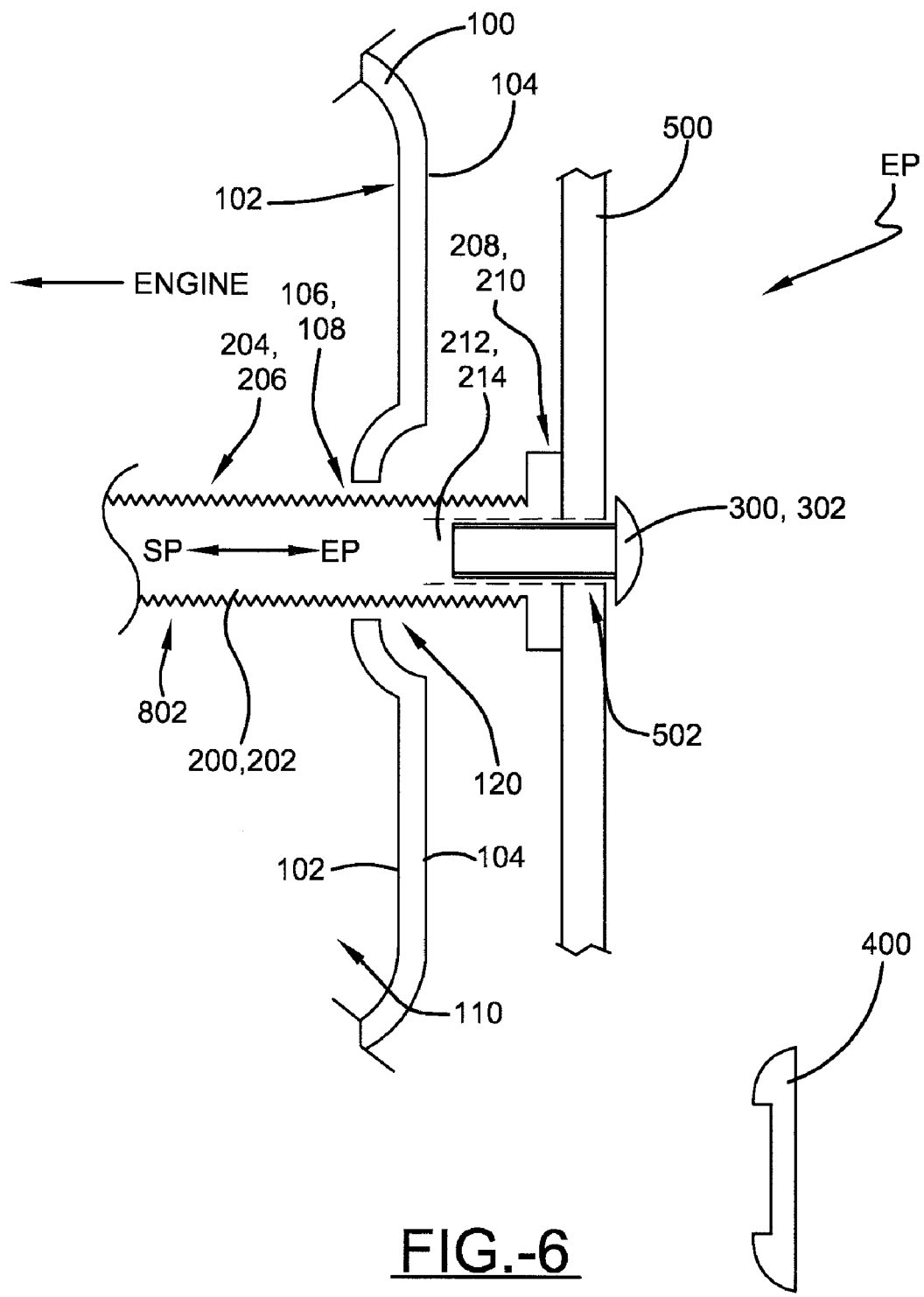
FIG. 6 is a cross-sectional plan view of a concealable license plate mounting system in an engagement position; wherein the connectors and bumper guide holes are threaded devices; in this illustration, a bolt.
Figure 7:
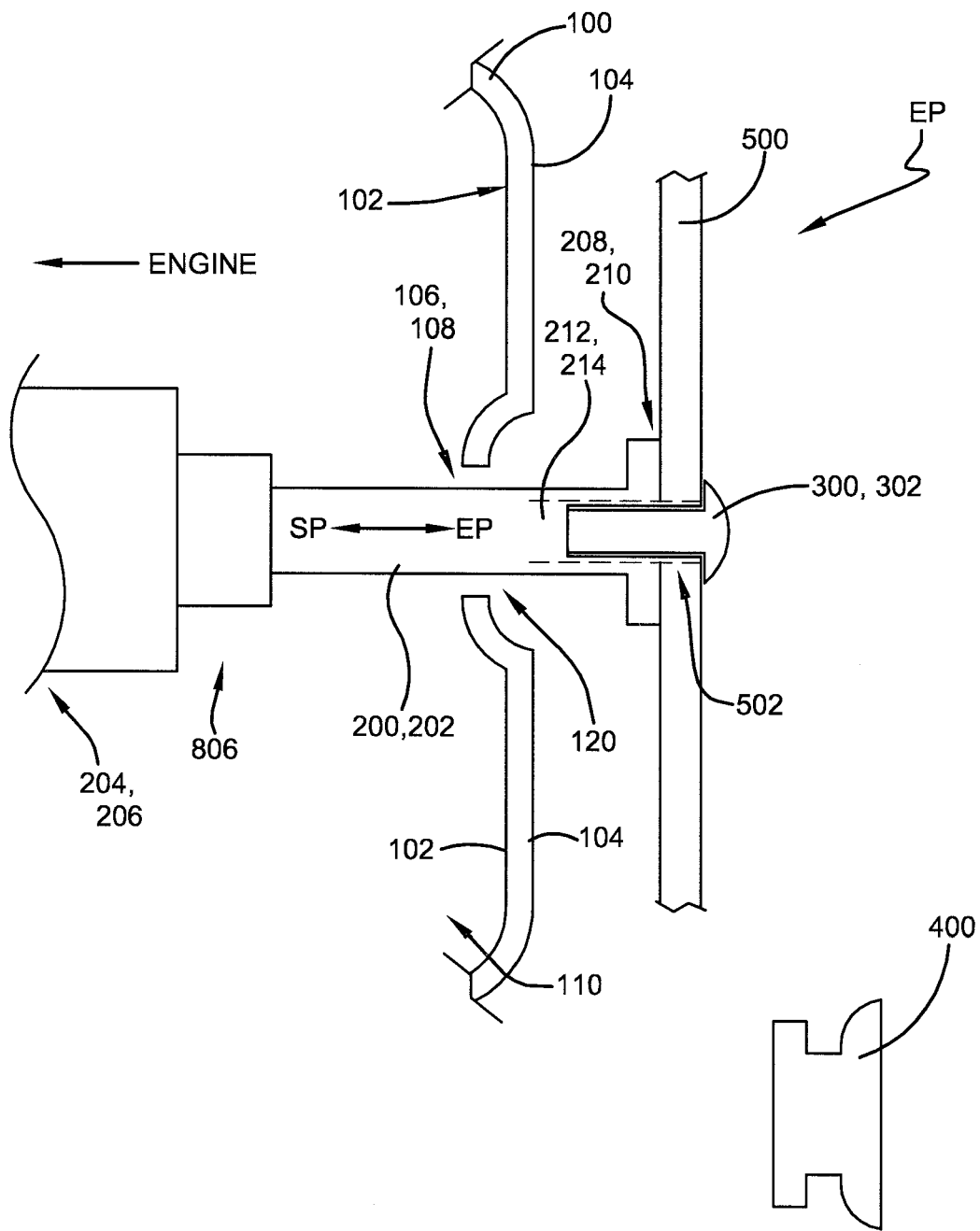
FIG. 7 is a cross-sectional plan view of a concealable license plate mounting system in an engagement position; wherein the connector selectively telescopes between the storage and engagement positions.

With continuing reference to FIGS. 3-5, license plate connectors 200, 202 can be of any variety—with some non-limiting examples being screws, bolts 802, studs 804, or telescoping devices 806—chosen in the sound engineering judgment of a person of ordinary skill in the art. When assembled according to the present invention, the license plate connectors 200, 202 have first ends 204, 206 that are proximal to the vehicle engine as compared to the connectors' second ends 208, 210 which are distal to the vehicle engine. In some embodiments of the invention, generally demonstrated in FIG. 6, the license plate connectors 200, 202 are bolts with threads, and the bumper's guide holes 106, 108 are also threaded to receive and control the movement of the connectors 200, 202 between the storage position SP and engagement position EP. In one embodiment of the invention, shown generally in FIG. 7, selectively telescoping license plate connectors 806 move between the first storage position SP and the second engagement position EP, and possibly even various positions in between the storage and engagement positions. In some embodiments of the present invention, the concealable license plate mounting system includes at least four vehicle bumper guide holes 106, 108, license plate connectors 200, 202, and fasteners 300, 302; all of which operate in a manner similar or identical to the descriptions contained herein.

The license plate connectors 200, 202 also have receiving cavities 212, 214 on or in their distal ends 208, 210 that are adapted to operatively receive first and second license plate fasteners 300, 302. Receiving cavities 212, 214 can be of any configuration known by a person of skill in the art to be capable of being releasably mated with a fastener 300, 302; including by way of one non-limiting example, female threads.

Figure 5A:
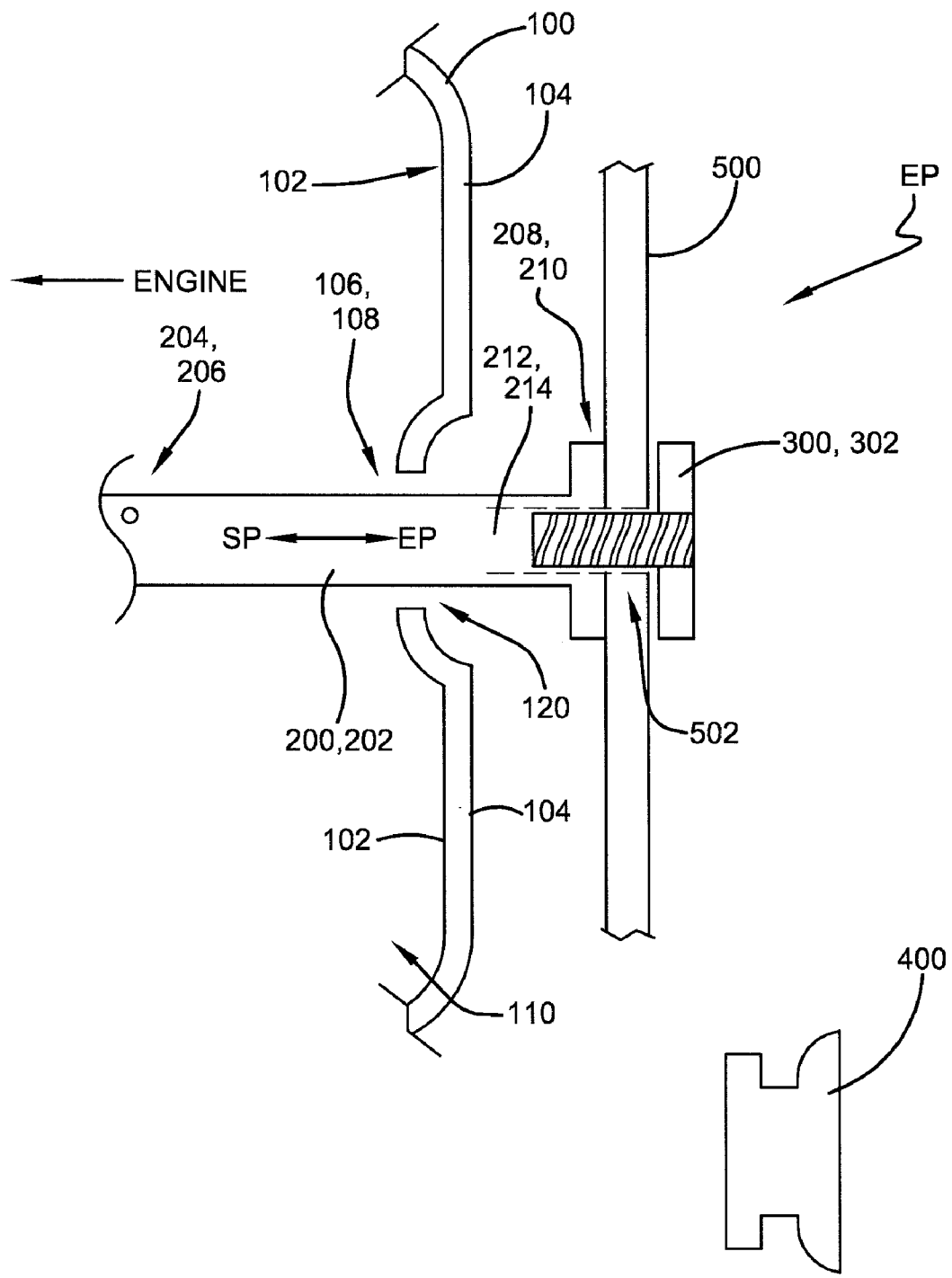
FIG. 5A is a cross-sectional plan view of a concealable license plate mounting system, using a nut style license plate fastener, in an engagement position.

The license plate fasteners 300, 302 can be of any variety—with some non-limiting examples being screws, bolts, studs, or as shown in FIG. 5A, nuts 910 secured to a threaded stud inserted in the connectors' receiving cavity—chosen in the sound engineering judgment of a person of ordinary skill in the art. In some embodiments of the present invention, the first and second license plate fasteners 300, 302 are only operatively mated with the license plate connectors' receiving cavities 212, 214 when the connectors 200, 202 are in the engagement position EP. In other embodiments, the fasteners 300, 302 are at least partially positioned within the receiving cavities 212, 214 of the connectors 200, 202 when the connectors 200, 202 are both in the storage and engagement positions (SP and EP). In still other embodiments, the fasteners 300, 302 are positioned entirely within the receiving cavities 212, 214 of the license plate connectors 200, 202 in the storage position SP, while being only at least partially positioned within the receiving cavities 212, 214 in the engagement position (so as to mate the fasteners 300, 302 within the connectors' receiving cavities 212, 214 and press the license plate 500 into operative engagement).

In another embodiment of the invention, cover caps 400 are operatively affixed to the distal ends 208, 210 of the first and second license plate connectors 200, 202 when the connectors 200, 202 are in the storage position SP. The cover caps 400, which can be of any material chosen in the judgment of a person of ordinary skill in the art, are designed to cover the license plate connectors 200, 202 and fasteners 300, 302 in a manner that conceals the license plate mounting components whilst in a storage position SP. The cover caps 400 can be releasably mated with (i.e. removable from) the vehicle bumper 100, or selectively movable into different positions (as described below), in any manner contemplated by a person or ordinary skill in the art. In a one embodiment of the invention, the vehicle bumper's recess 110 is at least partially defined by a cap port 120 that contains the guide holes 106, 108, is indented from the bumper's outer surface 104, and is—in at least some embodiments of the invention—adapted to releasably mate (or otherwise operatively affix) with cover caps 400 of a substantially similar shape and size.

As shown in FIG. 4, when the license plate connectors 200, 202 are in a storage position SP, the cover caps 400 are releasably fitted/mated to and/or within the cap port 120 in an operative first position wherein the outer surface 104 of the vehicle bumper 100 is a substantially planar surface consisting of portions of the both the vehicle bumper 100, 104 and the cover cap 400. For the purposes of this patent application, it should be clarified and understood that the recess 110 is meant to include any areas of the vehicle bumper 100 that reside within the outer surface of the bumper 100. Thus, because the exterior surface of the bumper can be substantially planar when the cover caps 400 are installed, a person of ordinary skill in the art would construe the installed cover caps 400 and bumper outer surface 104 to comprise the exterior surface of the bumper. Similarly, although the indented portion of the recess 110 referenced as the cap port 120 is defined by a cutout portion of the bumper's outer surface 104, because it is concealed by the assembled cover caps 400, it would be construed by a person of ordinary skill in the art—and thus is defined in this application—as a portion of the vehicle bumper's recess 110.

Figure 9:
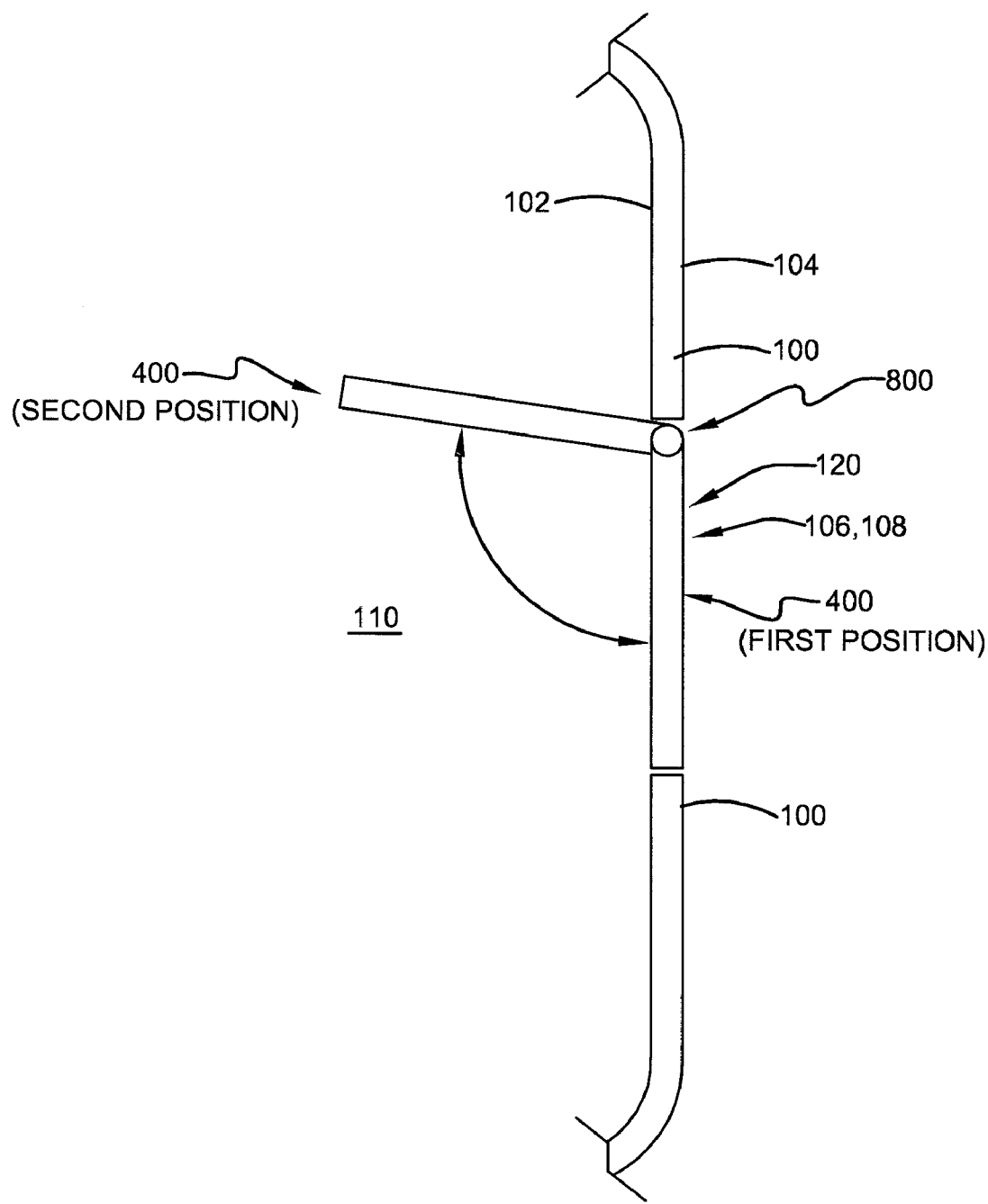
FIG. 9 is a cross-sectional plan view of a vehicle bumper of the concealable license plate mounting system; wherein the cover cap is mated within the cap port by a hinge connector, and is selectively movable between a first and second position.

On other embodiments of the invention, the cover caps 400 are releasably mated to and/or within the cap ports 120 by a hinge connector 800 (generally demonstrated in FIG. 9) that is designed to selectively move the cover caps 400 from the first position where the license plate connectors 200, 202 and fasteners 300, 302 are concealed within the bumper recess 110, into a second position where the cover caps are selectively moved into a position that permits the license plate connectors 200, 202 to move between a first storage position SP and a second engagement position EP.

Figure 8:
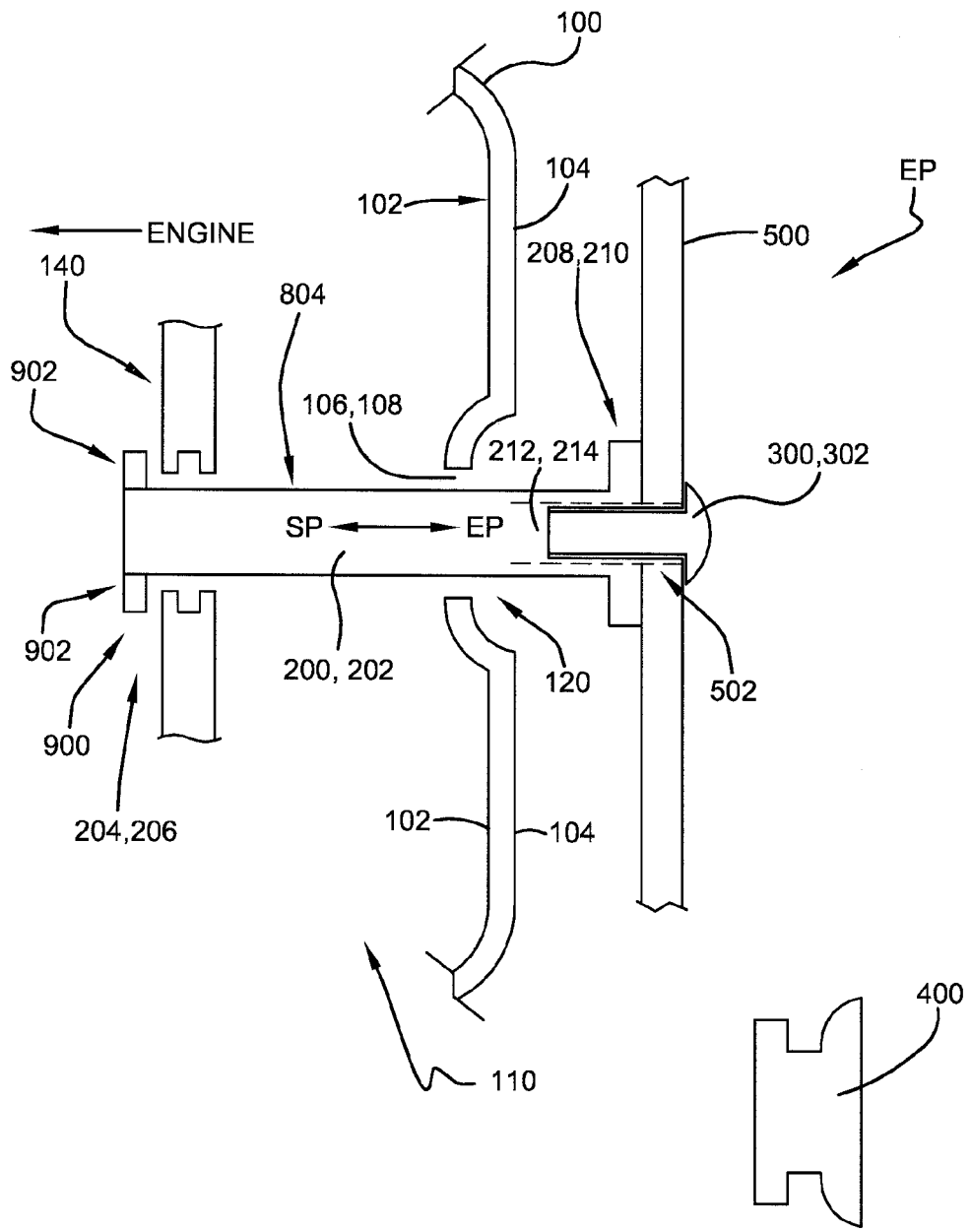
FIG. 8 is a cross-sectional plan view of a concealable license plate mounting system in an engagement position; wherein the connector's proximal end has a lock mechanism.

As generally demonstrated in FIG. 4, in still other embodiments of the present invention, the proximal ends 204, 206 of the license plate connectors 200, 202 (in one specific embodiment, a stud) additionally comprise a stop component 900 that is designed to prevent the connectors 200, 202 from being removed from the associated vehicle's bumper 100 through the guide holes 106, 108. In other embodiments, the vehicle bumper 100 additionally comprises a vertically disposed support member 140, 142 with horizontally positioned guide holes 144, 146. When the license plate connectors 200, 202 are horizontally positioned within the vehicle bumper's guide holes 106, 108 and the support member's horizontally positioned guide holes 144, 146, the connectors 200, 202 are slidably positioned and guided by the guide holes 106, 108, 144, 146 as they move between the storage position SP and the engagement position EP. Moreover, the stop component 900 contacts the support member 140 in the engagement position EP to both prevent the removal of the connectors 200, 202 through the guide holes 106, 108, 144, 146 and control the length that the connectors 200, 202 extend beyond the outer surface 104 of the bumper 100. As generally illustrated in FIG. 8, in some embodiments of the invention the stop component 900 is a lock mechanism 902 that is designed to engage the support member 140 or bumper guide hole 106, 108 so as to selectively secure the license plate connectors 200, 202 in either a storage position SP or engagement position EP. In yet other embodiments of the invention, various arrangements, combinations, and configurations of the components listed and described above are utilized.

With reference now to all of the FIGURES, the operation of the concealable license plate mounting system will now be described. The starting point for the methods claimed herein is a vehicle with a front bumper 100, having an outer surface 104, at least two guide holes 106,108, a recess 110 within the outer surface of the vehicle bumper, at least two cap ports 120, and a vertically disposed support member 140 positioned within the vehicle bumper's recess 110 and having at least two guide holes 144, 146. Such a bumper 100 is additionally used in conjunction with first and second license plate connectors 200, 202, having proximal ends 204, 206 with a lock mechanism 902 and distal ends 208, 210 with receiving cavities 212, 214, and first and second fasteners 302, 304, cover caps 400, 402, and an associated license plate 500 with at least two mounting apertures 502.

The assembly of the concealable license plate system, into a storage position wherein no portion of the concealable license plate system extends beyond the outer surface 104 of the vehicle bumper 100, is accomplished by various steps. First, the license plate connectors 200, 202 are horizontally positioned within the vehicle bumper's recess 110, vehicle bumper's guide holes 106, 108, and support member's guide holes 144, 146 in a manner wherein the connectors' distal ends 208, 210 are distal to the vehicle engine. Next, the first and second fasteners 300, 302 are operatively attached to the first and second connectors 200, 202, wherein the fasteners 300, 302 are at least partially positioned within the receiving cavities 212, 214 on the distal ends 208, 210 of the connectors 200, 202. Finally, the cover caps 400 are operatively affixed within the cap ports 120 so as to conceal the fasteners 300, 302 and license plate connectors 200, 202 and create a substantially planar outer surface 104 on the vehicle bumper 100.

The concealable license plate mounting system is then activated by removing the cover caps 400 from the cap ports 120, moving the first and second connectors 200, 202 into an engagement position EP wherein they are least partially extended beyond the outer surface 104 of the vehicle bumper 100, and triggering the lock mechanisms 902 to secure the connectors 2002, 202 in the engagement position EP. Next, the first and second fasteners 300, 302 are removed from the connectors' receiving cavities 212, 214, and the associated license plate 500 is positioned onto the connectors 200, 202 so that the mounting apertures 502 align with the connectors' receiving cavities 212, 214. Finally, the fasteners 300, 302 are re-inserted through the license plate's mounting apertures 502 and mated within the receiving cavities 212, 214.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A concealable license plate mounting system for use with an associated vehicle bumper having an outer surface, a recess within the outer surface of the vehicle bumper, and at least two guide holes for receiving and guiding the movement of license plate connectors within the recess, the concealable license plate mounting system comprising:
   a first license plate connector, having a proximal end and a distal end with a receiving cavity, wherein the first license plate connector is positioned entirely within the recess in the vehicle bumper in a storage position, and at least partially extended beyond the outer surface of the vehicle bumper in an engagement position;
   a second license plate connector, having a proximal end and a distal end with a receiving cavity, wherein the second license plate connector is positioned entirely within the recess in the vehicle bumper in a storage position, and at least partially extended beyond the outer surface of the vehicle bumper in an engagement position; and
   first and second fasteners, operatively mated with the receiving cavities of the first and second license plate connectors, respectively, when the license plate connectors are in the engagement position, so as to secure a license plate to the concealable license plate mounting system.

2. The concealable license plate mounting system of claim 1, wherein the first and second fasteners are at least partially positioned within the receiving cavities of the first and second license plate connectors in both the storage and engagement positions.

3. The concealable license plate mounting system of claim 2, wherein the first and second fasteners are positioned entirely within the receiving cavities of the first and second license plate connectors in the storage position, and wherein the first and second fasteners are positioned at least partially within the receiving cavities of the first and second license plate connectors in the engagement position.

4. The concealable license plate mounting system of claim 1, wherein:
   the proximal ends of the first and second license plate connectors are positioned proximal to an associated vehicle engine as compared to the distal ends which are positioned distal to the vehicle engine; and
   wherein first and second cover caps are operatively affixed to the distal ends of the first and second license plate connectors, respectively, when the first and second license plate connectors are in the storage position.

5. The concealable license plate mounting system of claim 4, wherein the proximal ends of the first and second license plate connectors additionally comprise a stop component, the stop component preventing the first and second license plate connectors from being removed from the associated vehicle bumper through the vehicle bumper's guide holes.

6. The concealable license plate mounting system of claim 5, wherein the associated vehicle bumper's recess has a vertically disposed support member with guide holes, the first and second license plate connectors are horizontally disposed and slidably positioned within the guide holes of the support member and the vehicle bumper, and the stop component contacts the support member in the engagement position to prevent the first and second license plate connectors from being removed from the associated vehicle bumper through the vehicle bumper's guide holes.

7. The concealable license plate mounting system of claim 1, wherein the associated vehicle bumper has at least four guide holes for receiving and guiding the movement of license plate connectors within the recess, and the concealable license plate mounting system additionally comprises:

third and fourth license plate connectors, having receiving cavities that operatively receive license plate fasteners, wherein the third and fourth license plate connectors are positioned within the associated vehicle bumper recess in a storage position, and at least partially extended beyond the outer surface of the vehicle bumper in an engagement position; and third and fourth fasteners, operatively mated with the receiving cavities of the third and fourth license plate connectors when the license plate connectors are in the engagement position.

8. The concealable license plate mounting system of claim 7, wherein the third and fourth fasteners are at least partially positioned within the receiving cavities of the first and second license plate connectors in both the storage and engagement positions.

9. The concealable license plate mounting system of claim 1, wherein the license plate connectors are bolts with threads, and the associated vehicle bumper's guide holes are threaded to receive and control the movement of the license plate connectors between the storage and engagement positions.

10. The concealable license plate mounting system of claim 1, wherein the license plate connectors are studs, the studs having a proximal end with a stop component preventing the license plate connectors from being removed from the associated vehicle bumper through the vehicle bumper's guide holes, and a distal end with a receiving cavity.

11. The concealable license plate mounting system of claim 1, wherein the license plate connectors can telescope between the first storage position and the second engagement position.

12. The concealable license plate mounting system of claim 5, wherein the stop component is a lock mechanism that secures the license plate connectors in one of the storage and the engagement position.

13. The concealable license plate mounting system of claim 1, wherein the associated vehicle bumper is located at the front of the associated vehicle.

14. A concealable vehicle license plate mounting system, comprising:

a vehicle having at least a frame, suspension, and vehicle body with a front bumper; the front bumper having an outer surface, at least two guide holes for receiving and guiding the movement of license plate connectors within a recess, a recess within the outer surface of the vehicle bumper, and a vertically disposed support member positioned within the vehicle bumper's recess and having at least two guide holes for receiving and guiding the movement of the license plate connectors within the recess;

a first license plate connector, having a proximal end and distal end with a receiving cavity that operatively receives a first license plate fastener, wherein the first license plate connector is positioned within a vehicle bumper guide hole and a support member guide hole, and wherein the first license plate connector is positioned entirely within the bumper recess in a storage position, and at least partially extended beyond the outer surface of the vehicle bumper in an engagement position;

a second license plate connector, having a proximal end and distal end with a receiving cavity that operatively receives a second license plate fastener, wherein the second license plate connector is positioned within a vehicle bumper guide hole and a support member guide hole, and wherein the second license plate connector is positioned entirely within the bumper recess in a storage position, and at least partially extended beyond the outer surface of the vehicle bumper in an engagement position; and first and second fasteners, wherein the first and second fasteners are at least partially positioned within the receiving cavities of the first and second license plate connectors in both the storage and engagement positions.

15. The concealable license plate mounting system of claim 14, wherein the vehicle bumper's recess is at least partially defined by a cap port, wherein the vehicle bumper's at least two guide holes for receiving and guiding the movement of license plate connectors within the recess are positioned within the cap port.

16. The concealable license plate mounting system of claim 15, additionally comprising cover caps, the cover caps operatively affixed to the vehicle bumper's cap port when the first and second license plate connectors are in a first storage position.

17. The concealable license plate mounting system of claim 16, wherein the cover caps are of a size and shape that can be releasably mated within the cap ports, and wherein the outer surface of the associated vehicle bumper can have a substantially planar surface when cover caps are mated within the cap ports in a first position.

18. The concealable license plate mounting system of claim 17, wherein the cover caps are releasably mated within the cap ports by a hinge connector, the hinge connector selectively moving the cover caps from the first position wherein the license plate connectors are concealed, and a second position wherein the cover caps are selectively moved to permit the license plate connectors to move between the storage and engagement positions.

19. A method comprising the steps of:

A) providing a vehicle with: 1) a front bumper, the front bumper having an outer surface, at least two guide holes, a recess within the outer surface of the vehicle bumper, at least two cap ports, and a vertically disposed support member positioned within the vehicle bumper's recess and having at least two guide holes; 2) first and second license plate connectors, having proximal ends with a locking mechanism and distal ends with receiving cavities; 3) first and second fasteners; 4) cover caps; and 5) a license plate with at least two mounting apertures;

B) assembling the concealable license plate system into a storage position, by: 1) horizontally positioning the first and second connectors within the vehicle bumper's recess, vehicle bumper's guide holes, and support member's guide holes in a manner wherein the distal ends are distal to the vehicle engine; 2) operatively attaching the first and second fasteners to the first and second connectors, wherein the fasteners are at least partially positioned within the receiving cavities on the distal ends of the connectors; 3) operatively affixing the cover caps within the cap ports to conceal the fasteners and license plate connectors and create a substantially planar outer surface on the vehicle bumper; and C) activating the concealable license plate system by: 1) removing the cover caps; 2) moving the first and second connectors into an engagement position wherein they are least partially extended beyond the outer surface of the vehicle bumper; 3) triggering the lock mechanisms to secure the connectors in the engagement position; 4) removing the first and second fasteners from the connectors' receiving cavities; 5) positioning the associated license plate onto the connectors so that the mounting apertures align with the connectors' receiving cavities; and 6) installing the fasteners to the license plate's mounting apertures and operatively securing the fasteners within the connectors' receiving cavities.

20. The method of claim 19, wherein:

step A additionally comprises providing cover caps that are releasably mated within the cap ports by a hinge connector, and the removal the cover caps in Step C additionally comprises hingedly moving the cover caps from a first position wherein the license plate connectors are concealed, into a second position wherein the cover caps are not concealed and the license plate connectors can freely move between the storage and engagement positions.

\* \* \* \* \*